United States Patent [19]

Nienhaus

[11] Patent Number: 4,595,383
[45] Date of Patent: Jun. 17, 1986

[54] TELESCOPIC SHAFT ASSEMBLY

[75] Inventor: Clemens Nienhaus, Lohmar, Fed. Rep. of Germany

[73] Assignee: Jean Walterscheid GmbH, Lohmar, Fed. Rep. of Germany

[21] Appl. No.: 652,763

[22] Filed: Sep. 20, 1984

[30] Foreign Application Priority Data

Sep. 24, 1983 [DE] Fed. Rep. of Germany ....... 3334709

[51] Int. Cl.[4] .................. F16C 3/03; A01B 71/00; B60K 17/28
[52] U.S. Cl. .................................. 464/162; 403/109; 464/182; 464/901
[58] Field of Search .................... 403/23, 109, 359; 464/162, 169, 172, 182, 901

[56] References Cited

U.S. PATENT DOCUMENTS

| 1,995,422 | 3/1935 | Gory | 464/172 |
| 2,468,182 | 4/1949 | Dempsey | 403/359 X |
| 2,524,853 | 10/1950 | Szekely | 464/162 X |
| 2,772,547 | 12/1956 | Nolan | 464/162 |
| 3,080,185 | 3/1963 | Walker | 464/901 X |
| 3,618,340 | 11/1971 | Geisthoff et al. | 464/162 |
| 4,236,388 | 12/1980 | Geisthoff | 464/169 |
| 4,338,797 | 7/1982 | Herchenbach | 464/172 X |

FOREIGN PATENT DOCUMENTS

| 2106171 | 9/1971 | Fed. Rep. of Germany | 464/182 |
| 603784 | 4/1978 | U.S.S.R. | 464/182 |

Primary Examiner—Stuart S. Levy
Assistant Examiner—Daniel P. Stodola
Attorney, Agent, or Firm—Toren, McGeady, Stanger, Goldberg & Kiel

[57] ABSTRACT

A telescopic shaft assembly for torque transmission in agricultural implements includes a first and a second profiled shaft arranged in torque transmitting engagement with each other with a pair of telescopic tubular tie anchors being releasably attached one with each of the profiled shafts, the tie anchors being joined together so as to be length adjustable relatively nonrotatable by a connecting mechanism which includes a pair of axially extending slots formed in one of the tie anchors and a transversely extending bolt formed in the other which is engageable within the slots, each of the tie anchors being attached, respectively, to one of the profiled shafts by spring actuated releasable engaging devices with the engaging device connecting the innermost of the two tubular tie anchors with one of the profiled shafts enabling disengagement thereof with a lower disengaging force than the other of the engaging devices.

4 Claims, 3 Drawing Figures

TELESCOPIC SHAFT ASSEMBLY

The present invention relates generally to torque transmitting assemblies particularly for transmitting torque between the power takeoff shaft of a tractor and an agricultural implement connected with the tractor. More specifically, the invention relates to a telescopic shaft assembly wherein a pair of profiled shafts which are telescopically insertable into each other are provided with torque transmitting beads and are connected with each other by coupling members.

In the prior art, telescopic torque transmitting shaft assemblies are known which are formed in three parts consisting of three telescopic tubes insertable into each other. Such an assembly is disclosed in DE-PS No. 29 08 029 and the shaft assembly described therein may be extended to a relatively long length and telescoped to a very short length, if required. A telescopic shaft assembly of this type is suitable for transmitting torque even in its extended position, but a disadvantage arises in that it is very expensive to produce. The production of the built-in control mechanism of the assembly which controls the extending sequence of the tubes which are insertable into each other is generally very costly and this is particularly significant and unfavorable in a situation where the transmission of torque with the assembly in an extended shaft length position is not required.

The present invention is directed toward providing a telescopic shaft assembly which, for the purposes of coupling, provides the necessary space between the tractor and an agricultural implement to be coupled therewith and which, after completion of the coupling process, may be telescoped into its working position simply by reversing the tractor.

The invention is directed toward providing a telescopic shaft assembly, which, for the purpose of coupling, may be extended beyond its working length and the objective of the invention is achieved in that the two shaft assembly halves are connected with each other by means of tie anchors which, during the insertion process, ensure accurate axial and angular guidance.

SUMMARY OF THE INVENTION

Briefly, the present invention may be described as a telescopic shaft assembly comprising: first and second profiled shafts telescopically arranged in torque transmitting engagement with each other; a pair of longitudinally extending tubular tie anchors telescopically insertable one within the other; a first and a second releasable engaging device each connecting one of said tubular tie anchors with one of said profiled shafts, respectively, each of said engaging devices comprising spring means applying a spring force holding said engaging devices and said profiled shafts, respectively, in engaged position and permitting disengagement thereof against the force of said spring means, said spring means operating to allow the inner one of said tubular tie anchors to be disengaged from its respective profiled shaft with a smaller disengaging force than the outer of said tie anchors; and connecting means telescopically joining said pair of tubular tie anchors together, said connecting means comprising a pair of axially extending slots formed in one of said tie anchors closed at both ends and a catch bolt fixed to the other of said tie anchors extending into said slots and movable axially therein; said connecting means operating to join said tie anchors nonrotatively relative to each other while permitting telescopic length adjusting relative movement therebetween.

Thus, in accordance with the invention, advantageous operating characteristics are achieved in that both the outer profiled tube and the inner profiled tube have held therein a tie anchor so as to be length adjustable and that the two tie anchors are insertable one into the other. The inner tie anchor is provided with two axially extending slots closed at both ends and the outer tie anchor is length adjustable but nonrotatively connected to the inner tie anchor by means of the catch bolt which is fixed to the outer tie anchor so as to be perpendicular to its longitudinal axis and which passes through the slots. At their ends held in the associated profiled tube, the two tie anchors are engageable in the extended position by means of at least one engaging member of the connecting means which is loaded radially outwardly by the force of the spring means and which engages into a recess arranged in the profiled tube. Of the two tie anchors, the inner one requires a smaller axial force to enable it to be pushed out of its engaged position with the profiled tube than does the outer tie anchor.

The advantage of the telescopic shaft assembly in accordance with the invention is that the engaging tie anchors permit the shaft parts to be telescoped are designed merely as guidance devices and that they do not have to be equipped with the capability of transmitting torque.

Therefore, the tie anchors may be light-weight and of economical design.

It is a further advantage of the invention that the force of the spring which is associated with the inner tie anchor is smaller than the force of the spring associated with the outer tie anchor. This ensures that the inner tie anchor is inserted first which makes it easier to thread in the drive shaft parts.

In accordance with a further feature of the invention, at least in the inwardly moving direction, the engaging member associated with the inner tie anchor has a smaller engaging or head angle than the engaging member associated with the outer tie anchor. This measure also serves to permit the inner tie anchor to move in first in order thereby to facilitate threading.

Each of the tie anchors and the profiled shafts are arranged with a bushing therebetween and in a further embodiment of the invention the bushing associated with the inner tie anchor is made of a low friction material.

In an additional advantageous aspect of the invention, the engaging member of the connecting means associated with the inner tie anchor may be arranged so as to be disengageable by means of a releasing device which may be actuated by the outer tie anchor.

Further, more detailed aspects of the invention which will be described hereinafter operate to facilitate threading in of the drive shaft parts and may be applied to the shaft in accordance with the invention either individually or in combination.

The sequence which is achieved as a result of the features of the invention provides an advantage in that when the two profiled shafts start, they have a joint guide on the outer tie anchor.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE PREFERRED EMBODIMENTS

Figure 1:
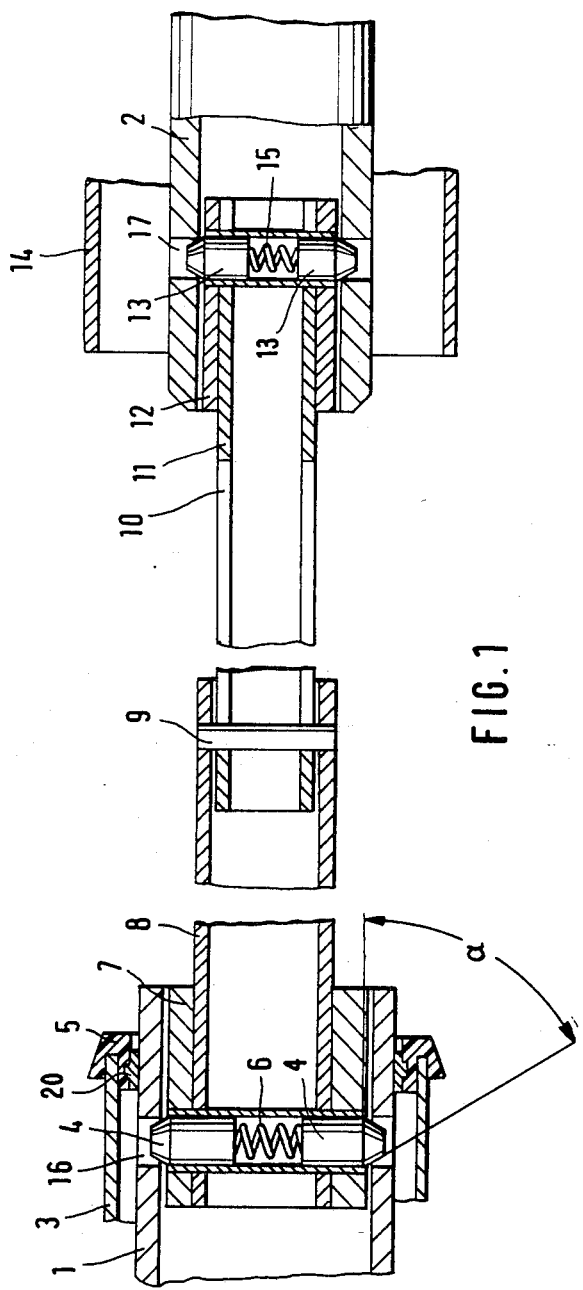
FIG. 1 is a sectional view showing a drive shaft assembly in accordance with the invention arranged in the extended position for coupling purposes.
Figure 2:
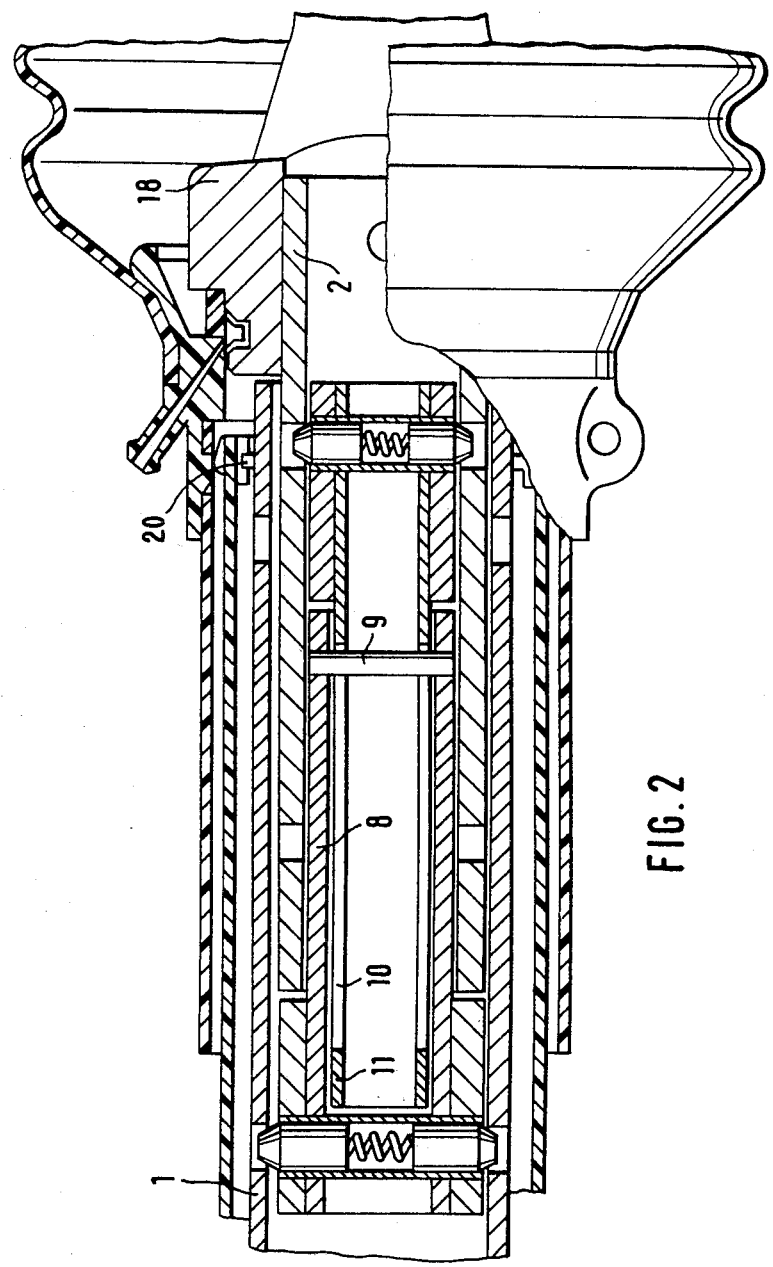
FIG. 2 is a sectional view illustrating the drive shaft assembly in the telescoped position.

Referring now to the drawings and particularly to FIGS. 1 and 2, there is shown a drive shaft assembly in accordance with the present invention which, in FIG. 1, is shown in the extended position. The drive shaft assembly consists essentially of a pair of profiled tubes or shafts 1 and 2 which are telescopically insertable into each other each of which has associated therewith a protective tube 3 and 14, respectively, the protective tubes also being telescopically insertable into each other.

The inner protective tube 3 which is supported on the outer profiled shaft 1 by means of a bearing 20 is provided with guide brackets 5 which are tapered toward the outside and which assist in inserting the inner protective tube 3 into the outer protective tube 14.

An outer tie anchor 8 is guided in the outer profiled shaft 1 by means of a bushing 7. At the end of the tie anchor 8 facing the outer profiled shaft 1, provision is made for an engaging device which consists of engaging member 4 having a spring 6 interposed therebetween and cooperating with bores 16 into which the engaging members 4 engage. As previously indicated, the present invention is intended primarily for use in transmitting torque between the power takeoff shaft of a tractor and an agricultural implement connected with the tractor and the force of the spring 6 must be such that, in case the tractor is uncoupled from the agricultural implement and the drive shaft, by mistake, is not disengaged, the latter can be extended in order to prevent the implement from turning over.

The shaft assembly of FIGS. 1 and 2 includes an inner tie anchor 11 having axially extending slots 10 formed therein, the slots 10 being closed at both ends.

A catch bolt 9 is affixed to the outer tie anchor 8 and extends through the slots 10. The inner tie anchor 11 is guided in the inner profiled shaft 2 by means of a bushing 12 and another engaging device is provided between the inner tie anchor 11 and the profiled shaft 2 as indicated at the right side in FIG. 1, this engaging device consisting essentially of engaging members 13 and a spring 15. The engaging device comprising the engaging members 13 engages into bores 17 formed in the inner profiled shaft 2.

The catch bolt 9 is provided at the end of the tie anchor 8 facing the inner profiled shaft 2 and the bolt 9 passes through the interior of the tie anchor 8 and through the slots 10 formed in the inner tie anchor 11. The inner tie anchor 11 is, in turn, guided in the inner profiled shaft 2 by means of the bush 12 and is also engageable by means of the engaging device consisting of the engaging members 13 and the spring 15 engaging into the bore 17.

When the drive shaft assembly is extended in order to be used between a tractor and an agricultural implement, the two tie anchors 8 and 11 are pulled out of the profiled shafts 1 and 2 until the bolt 9 engages the left end of the slots 10, as seen in FIG. 1. The tie anchors 8 and 11 can be mutually pulled out in the region of the length of the slots 10 so that a sufficiently large space is made available between the tractor and the implement in order to permit safe coupling.

Once coupled, the tractor is reversed relative to the implement in the process of which the inner tie anchor 11 is first inserted into the inner profiled shaft 2 and then the outer tie anchor 8 is also inserted into the inner profiled shaft 2.

FIG. 2 shows the drive shaft assembly of the invention in the telescoped or contracted condition and reference numeral 18 refers to a joint yoke provided at the end of the assembly.

Figure 3:
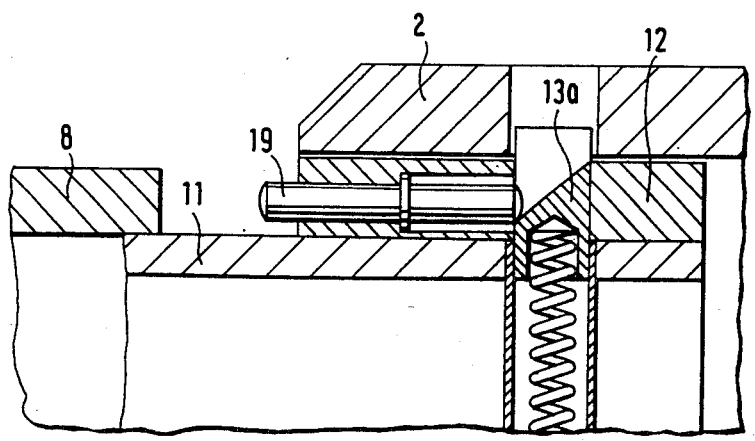
FIG. 3 is a sectional view illustrating in detail an embodiment of a releasable engaging device.

FIG. 3 illustrates another arrangement for the releasable engaging device which may be provided between the tie anchor and the profiled shaft. In FIG. 3, a device is depicted which consists essentially of a control pin 19 guided within the bushing 12. When the outer tie anchor 8 moves against the control pin 19, the engagement between the inner tie anchor 11 and the inner profiled shaft 2 is released by the control pin 19 which acts against an inclined edge of an engaging member 13a thereby ensuring that the inner tie anchor 11 may be inserted into the inner profiled shaft 2 first.

With reference to the embodiment of FIGS. 1 and 2, the invention is arranged so that the spring 15 exerts less of an engaging force than the spring 6. Thus, of the two tie anchors, the inner tie anchor 11 requires a smaller axial force to be pushed out of its engaged position than does the outer tie anchor 8. Furthermore, as will be seen from FIG. 1, the engaging members 4 may be formed with a head angle or engaging angle $\alpha$. As will be noted, the engaging members 13 are formed in a similar shape and in addition to different spring forces, the engaging members 13 associated with the inner tie anchor 11 may be formed with a smaller head angle than the head angle $\alpha$ of the engaging members 4 associated with the outer tie anchor.

Furthermore, as will be noted from FIG. 1, the bushing 7 is arranged between the outer tie anchor 8 and the outer profiled shaft 1, while the bushing 12 is arranged between the inner tie anchor 11 and the inner profiled shaft 2. The bushing 12 associated with the inner tie anchor 11 is made of a low friction material.

Thus, as will be seen from the foregoing, the invention provides a telescopic shaft assembly which, for the purposes of coupling thereof, may be extended beyond its working length. Advantages are achieved with the invention in that the two shaft halves are connected by means of tie anchors which, during the insertion process, ensure accurate axial and angular guidance.

Of course, it will be understood that, as is well known to those skilled in the art, the profiled shafts 1 and 2 are arranged in torque transmitting engagement with each other by torque transmitting beads (not shown) and are connected to each other by coupling members, the torque transmitting beads being in accordance with known structures.

While specific embodiments of the invention have been shown and described in detail to illustrate the application of the inventive principles, it will be understood that the invention may be embodied otherwise without departing from such principles.

What is claimed is:

1. A telescopic shaft assembly particularly for transmitting torque between the power takeoff shaft of a tractor and an agricultural implement, comprising:

first and second profiled shafts configured to provide telescopic engagement with each other including means for transmitting torque between said profiled shafts when said profiled shafts are telescopically engaged;

a pair of longitudinally extending tubular tie anchors telescopically insertable one within the other;

a first and a second releasable engaging device each connecting one of said tubular tie anchors with one of said profiled shafts, respectively;

each of said engaging devices comprising spring means applying a spring force holding said engaging devices and said profiled shafts, respectively, in engaged position and permitting disengagement thereof against the force of said spring means, said spring means operating to allow the inner one of said tubular tie anchors to be disengaged from its respective profiled shaft with a smaller disengaging force than the outer of said tie anchors; and connecting means telescopically joining said pair of tubular tie anchors together, said connecting means comprising a pair of axially extending slots formed on one of said tie anchors closed at both ends and a catch bolt affixed to the other of said tie anchors extending into said slots and movable axially therein;

said connecting means operating to join said tie anchors nonrotatively relative to each other while permitting telescopic length adjusting relative movement therebetween;

said spring means comprising a first spring member for the one of said engaging devices connecting the inner one of said tubular tie anchors with its respective profiled shaft and a second spring member for the other of said engaging devices connecting the outer of said tubular tie anchors with the other profiled shaft, said first spring member being formed to exert an engaging spring force which is smaller than the spring force of said second spring member.

2. An assembly according to claim 1, wherein said engaging devices each comprise at least one engaging member adapted to engage within a bore in one of said profiled shafts, said engaging member being formed with a slanted engaging surface having an engaging angle, said engaging devices having an engaging member associated with the inner one of said tubular tie anchors and an engaging member associated with the outer one of said tubular tie anchors, with the engaging member associated with the inner one of said tubular tie anchors having an engaging angle which, at least in the engaging direction is smaller than the engaging angle of the engaging member associated with the outer one of said tubular tie members.

3. An assembly according to claim 1, comprising a pair of bushings one interposed between the inner one of said tubular tie anchors and one of said profiled shafts and the other interposed between the outer one of said tubular tie anchors and the other of said profiled shafts with the bushing associated with the inner one of said tie anchors being made of a low friction material.

4. An assembly according to claim 1, wherein the one of said engaging devices associated with the inner one of said tie anchors is disengageable by means of a releasing device which is actuated by the outer one of said tubular tie anchors.

* * * * *